Patented Apr. 12, 1949

2,467,229

UNITED STATES PATENT OFFICE 2,467,229

COATING PROCESS AND ARTICLE

Lee Pritzker, Baltimore, Md.

No Drawing. Application May 10, 1946,
Serial No. 668,761

17 Claims. (Cl. 117—87)

This invention relates to decorative finishes and coatings on articles of manufacture, to compositions useful for producing such finishes and coatings, and to methods of producing both the compositions and such decorated articles. In the prior art various decorative and protective finishes of various types have been produced some of the better known being referred to as wrinkle finishes, spatter effects, hammered effects, etc. The wrinkle finishes depend on the production of a series of folds formed in tung oil compositions and related materials. Spatter effects are produced by spattering a second coat upon a base coat. Hammered effects are also produced by modifications in the manner of application of the coatings.

Among the objects of the present invention is the production of novel decorative finishes or surface coatings differing fundamentally from the prior art finishes.

Other objects include novel compositions utilizable for such purposes.

Still further objects include methods of producing finishes of the character set forth above.

Still further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In accordance with the present invention, novel decorative and surface finishes are produced by the utilization of a base coat which is of repellent character and over which a second coat is applied, particularly one having pronounced wetting properties. Because of the repellent properties of the first coat, particularly after it is dried or baked as the case may be until it is at least set to touch and preferably tack free, the second coat when applied segregates itself on the first coat at various areas thereon, forming a set or predetermined pattern which may then be dried. The term "set" pattern is used definitively to describe the effect obtained. The repellent coat is desirably produced from an organic base coating composition which may be of any desired type, such as paint enamel, lacquer, etc. of any ordinary type, modified however, to produce the repellency necessary for the purposes in hand. One test for the repellency of the base coat is its action toward mineral spirits. All films which repel mineral spirits are statisfactory as a base repellent coat. A quick test for the practicability of the repellent coating composition is to immerse the dried film in spirits and to withdraw it quickly. If the spirits runs off the panel without wetting the surface then the paint is practicable as a base coat in carrying out the present invention. However, it should be noted that the repellence is not exhibited in the wet or sticky state or at least that is not the test. The first coat must be at least set to touch to be effective and desirably should be tack free before the application of the second wetting coat. Repellent agents are thus incorporated into the composition to obtain the repellent character utilized in the base coat in accordance with the present invention and the degree of repellence of the first or base coat can be varied or controlled by the quantity of repellent agent in the paint.

The characteristics of the set pattern obtained may be said to be generally dependent on four factors and may be controlled by control of these factors, namely, first, the degree of repellence in the first coat; second, the ability of the second coat to wet the first coat which may be controlled by the addition of wetting agents or surface tension reducing agents, such as soap, aerosols, amines, or alkalies or other materials which tend to cause the second coat to wet the first coat better or in other words to be less repelled, which is equivalent to having less repellence inherent in the base coat; third, the viscosity of the second coat when applied, the more viscous the second coat the greater the force of repellency must be to cause it to flow away from a section of the surface of the first coat even though it does not wet it; and fourth, the volume of the coating composition applied in the second coat, a larger volume of composition causing a general broadening or coarsening of the set pattern assumed by the second coat.

Without limitation on the basis of theoretical considerations, it is believed that the repellent agent is a polar body and to be utilizable must either be initially differentially soluble in the composition, or must develop such differential solubility during the drying of the first coat. By differential solubility is meant that the repellent agent that is used is either more soluble in the warmed or heated composition or solvents present therein than it is at lower or ordinary such as room temperatures; or that during the drying of the first coat when oxidizable components are present, as for example, soaps of unsaturated higher fatty acids, lesser solubility develops as a result of such drying including oxidizing action. Whatever, however, may be the theoretical explanation, and without any limitation in that direction, pronounced effects are obtained by utilizing a base coat of repellent character which is dried or baked and application thereto of a second wetting coat which is adherent to the base coat at segregated areas thereon forming a set pattern as a result of the forces which come into play in the application of such coatings under the stated conditions.

In the preparation of organic coatings to possess the unique properties of drying to a film that will cause second or subsequent coats to be repelled as outlined above, repellent agents are incorporated into the coating composition to produce the property or phenomena referred to. These repellent agents can be prepared to give variable repellent properties dependent on the method of processing and the physical and chemical reactions involved during manufacture. They may be illustrated by two broad classes of repellent agents that may be employed in accordance with the present invention including first, heavy metal soaps of the higher fatty acids or mixtures of fatty acids obtained from glyceride oils, the heavy metals being illustrated by lead, zinc, manganese, calmium, strontium, barium and magnesium, while the fatty acids may be those obtained from drying, semi-drying and non-drying oils including for example, tung, linseed, oiticica, soya bean, fish, cottonseed, perilla, corn, etc. Generally the presence of oleic, linolic, or linoleic type acids are desirable in producing these soaps whether the individual acids themselves are employed or mixtures of such acids are utilized, as for example, soaps produced by saponification of oils of the types set forth above. In the latter case, mixtures of soaps are produced which may be mixtures of soaps of different metals with different acids or of the same metal with different acids, etc. The saponification may be carried out in any desirable way as by heating the stated oils with metallic compounds, salts, oxides, hydroxides, carbonates, etc. of the metals under conditions to produce the desired soaps.

A second type of repellent agent that may very desirably be employed are synthetic repellent waxes which are differentially soluble in hydrocarbon solvents, that is, are at least slightly more soluble in such solvents when hot than when they are cold. The synthetic repellent waxes are particularly useful when they are amines, and amides of the long chain fatty acids, that is, of acids having more than 7 carbon atoms and include, for example, such materials as octodecanamide, methylene bis octodecanamide, octadecylamine, sebaco-disteramid, etc. Many of these synthetic repellent waxes are available on the market under trade names known as "Acrawax C," "Acrawax B," "Durocer," "Strobowax," "Albacer," "Rezo Wax," "Glyco Wax," "Flexo Wax," "Cannauba Wax substitute No. 8," "Amide 1180-C," "Armourwax," "AM 2180-C," etc. "Armourwax" is understood to be a methylene bis octodecanamide having a melting point of about 134° C. and is insoluble in organic solvents below 100° C. but soluble above 100° C. "AM 2180-C" is believed to be a mixture of octadecylamines of approximately the composition 75% di-n-octadecylamine, 20% tri-n-octadecylamine, and about 5% of hydrocarbons and shows a melting point of approximately 55° C. Sebaco-disteramid available as "ADS-2180-C" has a melting point of approximately 140° C., is very insoluble at ordinary temperatures but is sparingly soluble at high temperatures sufficiently to give some fluxing action and is a valuable component to utilize as a synthetic repellent wax.

Generally in the utilization of such synthetic repellent wax type materials, they should have a melting point not below 55 to 60° C. and for practical purposes, a melting point of at least 90° C., they should be sparingly soluble or insoluble in aliphatic hydrocarbon solvents, etc., at ordinary temperatures at least, and they should be at least slightly more soluble in the hot than in cold such solvents, and they should not have any wetting properties or groups which give wetting properties to an extent to destroy the repellency desired in the first or base coat employed in the present invention. Possibly solubility to an extent of not more than 2% in mineral spirits at ordinary temperatures meets one of the requirements for such materials as outlined above.

Mixtures of soaps as set forth above, or mixtures of waxes as set forth above, may be employed as well as mixtures of soaps and waxes to produce the repellent character desired in the first or base coat.

To exemplify the production of soaps that may be utilized as repellent agents in accordance with the present invention, the following examples are given.

*Example 1*

| | lbs. |
|---|---|
| Linseed oil | 800 |
| Calcium hydroxide | 40–120 |
| High flash naphtha | 840 |

The fatty oil (i. e. linseed oil) is heated in the conventional manner to 500° F. and the calcium hydroxide slowly sprinkled in the batch. The oil is carefully stirred and the metallic oxide slowly worked in. When the reaction is complete and all the calcium hydroxide is reacted with the fatty oil, the stirring is stopped and the batch is held at 500 to 510° F. until a drop of oil on glass results in a hard pill. This reaction will require a holding time of approximately 45 minutes to 95 minutes. The batch is allowed to cool to 410 to 405° F., and is then thinned with the solvent (naphtha). The solution is then clarified or strained by any conventional means and will be stable for long periods of time.

*Example 2*

| | lbs. |
|---|---|
| Linseed oil | 800 |
| Manganese hydrate | 40–80 |
| Butyl Cellosolve | 700 |

Procedure the same as for Example 1.

*Example 3*

| | lbs. |
|---|---|
| Soya bean oil | 800 |
| Magnesium carbonate | 20–40 |
| Xylol | 800 |

These examples illustrate the types of metallic soap combinations that may be utilized in accordance with the present invention for inclusion in organic coating compositions to produce definite repellent properties.

Or combinations including the soaps in combination with resins such as alkyd resins may be produced and utilized as the repellent agent as illustrated in the following example.

*Example 4.*—2 parts of magnesium oxide are heated with 40 parts of soya bean oil to a temperature of about 280° C. and then 40 parts of xylol added to dissolve the reaction mixture and the final composition filtered. An alkyd resin may then be prepared by esterifying with glycerine in the usual manner, a mixture of 20 parts of rosin and 20 parts of the dibasic acid formed as the addition product of .8 part of alpha terpinene and .4 part of maleic anhydride. The mixed ester thus obtained is polymerized in the usual way with 50 parts perilla oil and during the final stage of cooking, 20 parts of the solution of magnesium soap, prepared as described above, are slowly added and combined into the batch. The resulting material is an alkyd resin having the soap material incorporated therein and which may be utilized as a repellent agent for the purposes of this invention.

The repellent base coat may be applied to any desired article of manufacture in any desired way. Thus surface effects may be produced on articles made of wood, metal, plastic or other material and the coating compositions may be applied as by brushing, spraying, through a silk screen or other screen. The base coat of repellent character is allowed to dry as by air drying, baking, or in any other way and to the dried coating there is applied in any desired way, as by brushing, spraying, dipping, wiping, screening, rubbing or otherwise, the second wetting organic coat. The second coat is then allowed to dry. The first coat possessing repellent properties is applied desirably in a smooth and uniform manner but may be applied in any other way, and when dried, the second coat is applied over it. The result is the production of the article carrying a decorative finish in which the second wetting coat material is adherent to the first coat at segregated areas thereon forming a set pattern. By control of the nature of the coating, the degree of repellency in the first coat, the wetting characteristics of the second coat, etc., the set or predetermined pattern obtained may be controlled as desired. The wet particles of the second or wetting coat will be repelled away from portions of the surface of the first coat immediately upon contact depending upon the surface tension or repellency existing on the surface of the dried film of the first coating. So that the second or wetting coat applied over the repellent film or first coat at the time of application will not flow or form a continuous film but various areas or portion of the first coat will be exposed through the segregated areas of the second coat. The amount or degree of repellency depends solely on the repellent controlled properties of the first dried coating and/or the wetting ability of the second coating. By the methods of control set forth, innumerable novel effects, designs or patterns may be obtained under definite control and set conditions on the surface of the article of manufacture.

Where the repellent agent employed is a soap as set forth above, it is particularly desirable that the composition contain at least 40% of oil in the non-volatile vehicle. The base coat containing such repellent can be air dried and in any event if baking is employed, the temperature utilized for baking the base coat should not be so high as to destroy its repellent character which generally will be at a temperature below 150° F.

In the utilization of the repellent agents of synthetic wax type, as noted, these synthetic wax repellent agents are soluble hot in hydrocarbon solvents both aromatic and aliphatic but insoluble in cold or at least there is a differential solubility as indicated above. The coating compositions containing the synthetic repellent wax are best employed when the repellent coat is baked. The explanation may lie in the fact that when baked, the wax melts and comes to the surface so that when the coating is dry there is a thin film of repellent wax on the surface of the paint. However, if the wax is added in the molten state or the coating composition warmed up just prior to use, enough of the wax may remain in solution to be effective without the baking step. Waxes which work desirably in accordance with the present invention are those which repel spirits if the wax alone is melted and flowed out on a panel where it is allowed to cool.

While a wide variety of compositions may be utilized in accordance with the present invention employing the repellent agents in the first coat, such compositions including as indicated, paints, enamels, lacquers such as cellulose ester lacquers, alkyd resin compositions, etc., no materials should be present in an amount which destroy the repellent character. Certain materials hereinafter called repellency-impeding agents like urea formaldehyde resins, melamine formaldehyde resins, ethyl cellulose, chlorinated rubber, nitrocellulose, should not be present in an extent generally of more than 10% in the composition since they modify the repellent character of the base coat and the 10% limitation is a general limitation for practicability in the repellent compositions utilized in accordance with this invention.

The following examples will illustrate the invention.

Example 5

| | |
|---|---|
| Para-phenyl formaldehyde resin_____lbs__ | 100 |
| China wood oil_____gal__ | 12½ |
| Linseed oil_____gal__ | 12½ |
| Solvents and drier_____lbs__ | 300 |
| Powdered "Acrawax C"_____lbs__ | 9 |

The varnish is compounded in any acceptable method and the wax is ground into the compounded varnish by means of a roller or pebble mill or in any other desired way. When baked for 10 minutes at 250° F., the film of varnish is very repellent. The composition may be modified by including 60 lbs. of melamine formaldehyde resin in a 50% solution added to the above formula to increase the hardness of the resulting coat, in which event the amount of "Acrawax C" should desirably be doubled if the same degree of repellence is to be retained. Such varnish may be pigmented with any colored pigments to give paints of desired color effect.

To illustrate the utilization of a repellent synthetic wax in a natural resin varnish, the following example will serve.

Example 6

| | pounds |
|---|---|
| Chrome green | 250 |
| "ADS-2180-C" (Armour Co.) | 7½ |
| Varnish | 750 |

The varnish employed may be of any desired type of 15 gal. length, as for example, the following illustrative Congo-castor oil varnish:

| | pounds |
|---|---|
| Rerun Congo resin | 100 |
| Dehydrated castor oil | 120 |
| Mineral spirits | 220 |
| 6% cobalt naphthenate | 1 |
| 24% lead naphthenate | 2 |

The varnish may be cooked and compounded in any generally accepted manner in the trade and utilized in producing the repellent finish referred to above in Example 6.

The following example will illustrate an alkyd resin composition containing a synthetic repellent wax, the composition being utilized as the repellent coat.

Example 7

| | pounds |
|---|---|
| Titanium dioxide | 300 |
| "Armourwax" powdered | 7 |
| Alkyd resin | 500 |
| Mineral spirits | 195 |
| 6% cobalt naphthenate | 5 |
| 24% lead naphthenate | 10 |

The alkyd resin may be utilized in accordance with Navy Specification 52R13 and may for example, be that produced by Reichhold Chemical Company "P296."

Any of the synthetic wax containing repellent coatings as produced above may be utilized in accordance with the present invention to produce the first coat which is desirably baked and over which any desired wetting composition may be applied. The second coat used either over the wax type or soap type or other base coat, may vary widely in character. It may actually be the same as the first coat, or merely differentiated in pigment, or it may be modified as herein set forth to have pronounced wetting properties. The specific examples given below for second coats applied over the soap base coatings, may be used over the wax base coating also.

The following examples will illustrate repellent coating compositions produced with repellent soaps.

*Example 8.*—A typical varnish formula may be the Navy Spar Varnish, Specification 52–V–17.

| Para phenyl formaldehyde resin | lbs | 100 |
|---|---|---|
| China wood oil | gal | 12½ |
| Linseed oil | gal | 12½ |
| Solvents and driers | lbs | 300 |
| 50% dispersion repellent soap in coal tar naphtha | lbs | 60 |

The repellent soap employed may be any of those produced in accordance with the present invention, as for example, those set forth above in Examples 1, 2 and 3. The compositions may be pigmented to any desired color.

A coating of repellent character produced from the above type of composition and dried, may then be treated with a second coat of any desired suitable wetting character, as for example, some of the wetting coatings given in examples set forth below.

The following examples will illustrate complete systems utilizing a repellent base coat containing a repellent soap and the wetting coat applied thereover.

*Example 9A.*—The repellent base coat may be produced from the following:

| Lampblack | lbs | 15 |
|---|---|---|
| Iron Red | lbs | 100 |
| Varnish | gal | 80 |
| Thinner and drier | gal | 5 |
| Example 1 above soap | gal | 5–10 |

*Example 9B.*—The wetting coat may be compounded from the following:

| Lampblack | lbs | 5 |
|---|---|---|
| Iron Red | lbs | 25 |
| Iron Yellow | lbs | 25 |
| Varnish | gal | 85 |
| Thinner and drier | gal | 10 |
| Butyl Cellosolve | gal | ½–1 |

Coatings of the compositions 9A and 9B above may be manufactured in any desired way. The article of manufacture to be coated is treated first with the base coat of Example 9A and allowed to dry. When dried, the second coat of Example 9B is applied and upon drying it will be found that a set pattern produced by segregated areas of the second coat adherent to the undercoat is obtained exposing portions of the undercoat. An effect simulating artificial leather may be produced. By increasing the wetting or penetrating properties of the second coat, as for instance, by the addition of more surface tension reducing agents or by hydrophyllic materials such as butanol, alcohol, butyl cellosolve or the like, less repellency will result and a materially modified pattern will be formed. Likewise, increasing the surface tension of the first coat by increasing the quantity of repellent solution in the first composition, and decreasing the tension reducing agents in the second coating composition such as the butyl cellosolve, will result in larger areas being repelled and modifying the design and effect produced.

*Example 10A.*—A first coat may be produced from the following:

| Ultra-Marine Blue | lbs | 25 |
|---|---|---|
| Titanium dioxide | lbs | 100 |
| Titanox RC–HT | lbs | 100 |
| Lampblack | lb | 1 |
| Varnish | gal | 65 |
| Thinner and driers | gal | 5 |
| Solution from Example 2 above | gal | 5–10 |

*Example 10B.*—Second coat: The wetting coat employed may be:

| Aluminum pigment paste | lbs | 100 |
|---|---|---|
| Varnish | gal | 50 |
| Butanol | gal | 1 |
| Xylol | gal | 1 |

The several coating compositions 10A and 10B may be compounded in any desired way and utilized as successive coatings as taught herein to produce a first coat of blue gray color and a second coat of aluminum bronze finish. The first coat is applied to the article of manufacture and then dried, whereupon the second coat is applied and dried. The effect obtained will simulate hammered metal. By increasing the amount of the repellent solution of Example 2 in the first coat, more repellency is obtained and larger areas will be exposed when the second coat is applied, giving a coarser texture or design. Likewise, increasing the xylol or butanol in the wetting coat will decrease the texture. If more than two colors or hues or shades are desired, then the first coat having repellent properties may be applied and a second coat of any organic coating treated with repellent solution applied over it. This second coat will not form a continuous film but will be repelled away in sections from the surface of the first coat. However, areas of the second coat when dry will still possess the property of repellency in accordance with the present invention so that a third coat applied over coats 1 and 2 give a multiple colored effect to the article of manufacture. This same procedure may be utilized in connection with any of the compositions of the present invention.

A further example of a repellent coat produced with the synthetic soap is the following.

Example 11

| Medium Chrome Yellow | lbs | 640 |
|---|---|---|
| Varnish | gal | 70 |
| Solution from Example 3 above | gal | 10 |

The resulting paste produced from this material is suitable for silk screen work. For example, in utilizing this composition, a novel effect is obtained as follows. The design or figure or pattern desired is cut into a silk screen and the coating of Example 11 above applied directly to the surface of the article desired to be decorated. When dry, a second coat of wetting character, as for example, any of those set forth above, may be applied. It will be repelled away from the first coat design covering all the area not taken up by the design of the first coat, allowing the pattern or design to stand out in bas relief. Similar procedures may be utilized with any of the other compositions set forth above.

If desired, differently colored pastes or compositions as set forth above may be applied to different sections of the article and multiple color effects obtained by any combination of such multiple repellent coats or multiple wetting compositions.

Further it has been found possible to modulate the repellency of the first coat in order to predetermine particular designs, patterns, pictures, or configurations thereon. Such modulation of the first coat may be carried out in a variety of ways. For example if the dried surface of the first or repellent coat is disturbed as by chemical or physical action, by heat, or mechanical means, it is possible to destroy the repellent property of the dried first coat at the point where such disturbance has taken place. By modulating the surface of the first coat in accordance with some design or pattern, the areas or portions of the first coat thus disturbed will not repel the second coat applied thereover but at the points where such disturbance has taken place, the second coat will adhere as a continuous film resulting in producing a configuration or design of the character impressed by the disturbing action, while the normal effect produced by the repellent action of the first coat toward the second coat will appear in those portions of the coated surface where the first coat has not been modulated. It is a surprising fact that by merely touching the surface of the dried or tack free first coat with a patterned roller, stamp, or other mechanical device, modulation of the repellent action of that first coat will be produced. No change is necessarily apparent in the first coat in producing such modulation of the repellency and where the surface has been touched by a roller or stamp or other mechanical device in this way, there will be no apparent change until the application of the second coat. Upon application of the second coat, however, the latter will as indicated above, adhere to those portions of the first coat where the modulation has been produced despite the fact that no apparent change in that first coat was visible to the eye.

A simple method of utilizing this discovery and the modulation of the repellent coat, is to make a soft rubber roller having some design produced therein either by way of ridges or depressions and running the roller over the dried first coat so that a repetitive pattern is produced although no visible effect is yet apparent at the time. Wherever the ridges or other portions of such roller touch the first coat, the repellency of the coat at such points is disturbed or modulated and the application of the second coat then results in a design of the character referred to. Such rollers may, therefore, be produced and utilized to give leather, crystalline, alligator, or any other effect desired, resulting in a composite final surface appearance of the impressed modulations on the normal set pattern.

The invention may also be used in a variety of other ways to modify the character of the set pattern obtained. Thus there may be formed on the surface of an article of manufacture, a configuration or design with a surface coating such as paint, enamel, varnish, lacquer, stencil ink, plastic or the like, possessing repellent qualities as produced in accordance with the present invention. The coating applied in this particular design, letter, geometrical configuration, or otherwise, on the surface of an article of manufacture is allowed to dry or baked as the case may be and after having been set, the second coating applied as described above. The repellent properties of the first coat applied as a particular design or configuration appearing on the surface of the article of manufacture, will cause the second coat to establish itself over the area surrounding the particular design or configuration, thus leaving the latter free of the second coat and standing out substantially in bas relief. For example, any predetermined geometrical design or series of letters may thus be applied as the first coat, dried, and the second wetting coat then applied and dried. The latter will run away from those portions of the surface carrying the repellent coating, leaving the latter such as letters or words or designs exposed and visible through the open portions of the second coat.

Various combinations of expedients in accordance with this invention may be utilized in modifying and producing a variety of different effects in accordance with the present invention.

While finished compositions may be produced and sold in accordance with the present invention to produce the effects desired, the repellent agents themselves may be sold as entities to be added to commercially available varnishes, lacquers, enamels, paints, etc., such repellent agents being sold either in dry condition or in the form of suspensions or solutions produced in accordance with the examples set forth above.

This application is a continuation-in-part of an application entitled Process for obtaining decorative finishes, filed December 7, 1945, Serial No. 633,521.

Having thus set forth my invention, I claim:

1. An article of manufacture carrying a coating of drying oil and resin and containing octodecanamide and not more than 10% of a repellency-impeding agent to make said coating when dry, repellent to mineral spirits, and a second coating of drying oil and resin but containing no octodecanamide, adherent to said first coating at segregated areas only thereon forming a set pattern.

2. An article of manufacture carrying a resinous coating and containing octodecanamide and not more than 10% of a repellency-impeding agent to make said coating drying by oxidation when dry, repellent to mineral spirits, and a second coating of resin but containing no octodecanamide, adherent to said first coating at segregated areas only thereon forming a set pattern.

3. An article of manufacture carrying a coating of drying oil and resin and containing octadecylamine and not more than 10% of a repellency-impeding agent to make said coating when dry, repellent to mineral spirits, and a second coating of drying oil and resin but containing no octadecylamine, adherent to said first coating at segregated areas only thereon forming a set pattern.

4. An article of manufacture carrying a resinous coating and containing octadecylamine and not more than 10% of a repellency-impeding agent to make said coating drying by oxidation when dry, repellent to mineral spirits, and a second coating of resin but containing no octadecylamine, adherent to said first coating at segregated areas only thereon forming a set pattern.

5. An article of manufacture carrying a coating of drying oil and resin and containing sebaco-disteramid and not more than 10% of a repellency-impeding agent to make said coating when dry, repellent to mineral spirits, and a second coating of drying oil and resin but containing no sebaco-disteramid, adherent to said first coating at segregated areas only thereon forming a set pattern.

6. An article of manufacture carrying a resinous coating and containing sebaco-disteramid and not more than 10% of a repellency-impeding agent to make said coating drying by oxidation when dry, repellent to mineral spirits, and a second coating of resin but containing no sebaco-disteramid, adherent to said first coating at segregated areas only thereon forming a set pattern.

7. The method of claim 17, in which modulating is carried out by running a patterned roller over the surface of the first coat, the second coat being adherent to said first coat at the portions thereof touched by the patterned roller.

8. An article of manufacture carrying an organic base coat of a film-forming component selected from drying oils and resins which dries by oxidation, said coat containing a repellent agent to make the coat repellent when set, to mineral spirits, and containing not more than 10% of a repellency-impeding agent and a second organic base coat of a film-forming component selected from drying oils and resins which dries by oxidation, capable of wetting the first coat when set, but containing no repellent agent and adherent thereto at segregated areas only thereon forming a set pattern, the repellent agent being selected from the group consisting of heavy metal soaps of the higher fatty acids obtained from glyceride oils and synthetic waxes constituted of amines, amides, and imides of fatty acids having more than 7 carbon atoms, and mixtures of said soaps and waxes.

9. An article of manufacture carrying an organic base coat of a film-forming component selected from drying oils and resins which dries by oxidation, said coat containing a repellent agent to make the coat repellent when set, to mineral spirts, and containing not more than 10% of a repellency-impeding agent and a second wetting organic base coat of a film-forming component selected from drying oils and resins which dries by oxidation, capable of wetting the first coat when set, but containing no repellent agent and adherent thereto at segregated areas only thereon forming a regularized predetermined pattern, the repellent agent being selected from the group consisting of heavy metal soaps of the higher fatty acids obtained from glyceride oils and synthetic waxes constituted of amines, amides, and imides of fatty acids having more than 7 carbon atoms, and mixtures of said soaps and waxes.

10. An article of manufacture carrying an organic base coat of a film-forming component selected from drying oils and resins which dries by oxidation, said coat containing a repellent agent to make the coat repellent when set, to mineral spirits, and containing not more than 10% of a repellency-impeding agent and a second wetting organic base coat of a film-forming component selected from drying oils and resins which dries by oxidation, capable of wetting the first coat when set, but containing no repellent agent, and adherent thereto at segregated areas only thereon forming a set geometrical pattern, the repellent agent being selected from the group consisting of heavy metal soaps of the higher fatty acids obtained from glyceride oils and synthetic waxes constituted of amines, amides, and imides of fatty acids having more than 7 carbon atoms, and mixtures of said soaps and waxes.

11. An article of manufacture carrying an organic base coat of repellent character containing a film-forming component selected from drying oils and resins which dries by oxidation, a differentially soluble, repellent polar body to make the coat repellent when set, to mineral spirits, and not more than 10% of a repellency-impeding agent, said base coat being modulated in its repellent character, and a second wetting organic base coat of a film-forming component selected from drying oils and resins which dries by oxidation, capable of wetting the first coat when set, but containing no repellent agent, and adherent thereto at segregated areas only thereon forming a set pattern, the repellent agent being selected from the group consisting of heavy metal soaps of the higher fatty acids obtained from glyceride oils and synthetic waxes constituted of amines, amides, and imides of fatty acids having more than 7 carbon atoms, and mixtures of said soaps and waxes.

12. An article of manufacture carrying an organic base coat of repellent character containing a film-forming component selected from drying oils and resins which dries by oxidation, a differentially soluble, repellent synthetic wax to make the coat repellent when set, to mineral spirits, and not more than 10% of a repellency-impeding agent, and a second organic base coat of a film-forming component selected from drying oils and resins which dries by oxidation, capable of wetting the first coat when set, but containing no repellent agent, and adherent thereto at variegated areas only thereon, the wax being selected from the group consisting of amines, amides, and imides of fatty acids having more than 7 carbon atoms.

13. An article of manufacture carrying an organic base coat of repellent character containing a film-forming component selected from drying oils and resins which dries by oxidation, a differentially soluble, repellent synthetic wax and a repellent soap to make the coat repellent when set, to mineral spirits, and not more than 10% of a repellency-impeding agent, and a second organic base coat of a film-forming component selected from drying oils and resins which dries by oxidation, capable of wetting the first coat when set, but containing no repellent agent, and adherent thereto at variegated areas only thereon, the wax being selected from the group consisting of amines, amides, and imides of fatty acids having more than 7 carbon atoms, and the soap being selected from the group consisting of heavy metal soaps of the higher fatty acids obtained from glyceride oils.

14. The method of ornamenting an article of manufacture which comprises applying thereto an organic base coat of a film-forming component selected from drying oils and resins which dries by oxidation, said coat containing a repellent agent to make the coat repellent when set, to mineral spirits, and containing not more than 10% of a repellency-impeding agent, drying said coat until at least tack free, applying thereover a second organic base coat of a film-forming component selected from drying oils and resins which dries by oxidation, capable of wetting the first coat when set, but containing no repellent agent, and adherent to the first at variegated areas only thereon forming a set pattern and drying the latter, the repellent agent being selected from the group consisting of heavy metal soaps of the higher fatty acids obtained from glyceride oils and synthetic waxes constituted of amines, amides, and imides of fatty acids having more than 7 carbon atoms, and mixtures of said soaps and waxes.

15. The method as set forth in claim 14 in which the repellent agent is a synthetic wax selected from the group consisting of amines, amides, and imides of fatty acids having more than 7 carbon atoms.

16. The method of ornamenting an article of manufacture which comprises applying thereto an organic base coat containing a film-forming component selected from drying oils and resins which dries by oxidation, a differentially soluble repellent synthetic wax to make the coat repellent when set, to mineral spirits, and not more than 10% of a repellency-impeding agent, baking said coat, applying thereover a wetting organic base coat containing no repellent agent and different from said first coat, and drying the latter to produce a second coat adherent to the first at variegated areas only thereon in a set pattern, the wax being selected from the group consisting of amines, amides, and imides of fatty acids having more than 7 carbon atoms.

17. The method of ornamenting an article of manufacture which comprises applying thereto an organic base coat of a film-forming component selected from drying oils and resins which dries by oxidation, said coat containing a repellent agent to make the coat repellent when set, to mineral spirits, and containing not more than 10% of a repellency-impeding agent, drying said coat until at least tack free, modulating the repellency of said coating, applying thereover a second organic base coat containing no repellent agent, and drying the latter to produce a second coat adherent to the first at variegated areas only thereon, the repellent agent being selected from the group consisting of heavy metal soaps of the higher fatty acids obtained from glyceride oils and synthetic waxes constituted of amines, amides, and imides of fatty acids having more than 7 carbon atoms, and mixtures of said soaps and waxes.

LEE PRITZKER.

REFERENCES CITED

The following references are of record in the file of this patent:

UNITED STATES PATENTS

| Number | Name | Date |
| --- | --- | --- |
| 1,344,645 | Meyer | June 29, 1920 |
| 1,561,324 | Guenot et al. | Nov. 10, 1925 |
| 2,066,296 | Lyons | Dec. 29, 1936 |
| 2,069,786 | Meulen | Feb. 9, 1937 |
| 2,108,805 | Finzel et al. | Feb. 22, 1938 |
| 2,204,550 | Murray | June 18, 1940 |
| 2,216,362 | Wilson | Oct. 1, 1940 |
| 2,320,644 | Nill | June 1, 1943 |
| 2,350,292 | Sermattei | May 30, 1944 |
| 2,391,620 | Quarles | Dec. 25, 1945 |